United States Patent
Kodani et al.

(10) Patent No.: US 9,385,568 B2
(45) Date of Patent: Jul. 5, 2016

(54) STATOR AND ELECTRIC MOTOR HAVING THE SAME

(71) Applicants: SHINANO KENSHI KABUSHIKI KAISHA, Ueda-shi, Nagano (JP); YAMADA MANUFACTURING CO., LTD., Kiryu-shi, Gunma (JP)

(72) Inventors: Masayuki Kodani, Nagano (JP); Nobuchika Maruyama, Nagano (JP); Keisuke Wakabayashi, Isesaki (JP); Nobuyuki Kabasawa, Isesaki (JP); Yasuaki Motegi, Isesaki (JP); Daisuke Kiryu, Isesaki (JP)

(73) Assignees: SHINANO KENSHI KABUSHIKI KAISHA, Ueda-shi (JP); YAMADA MANUFACTURING CO., LTD., Kiryu-shi (JP)

( * ) Notice: Subject to any disclaimer, the term of this patent is extended or adjusted under 35 U.S.C. 154(b) by 170 days.

(21) Appl. No.: 14/070,830

(22) Filed: Nov. 4, 2013

(65) Prior Publication Data
US 2014/0145544 A1  May 29, 2014

(30) Foreign Application Priority Data
Nov. 29, 2012  (JP) .................. 2012-261039

(51) Int. Cl.
| H02K 3/04 | (2006.01) |
| H02K 1/00 | (2006.01) |
| H02K 3/48 | (2006.01) |
| H02K 3/34 | (2006.01) |
| H02K 3/12 | (2006.01) |
| H02K 1/16 | (2006.01) |

(52) U.S. Cl.
CPC ............. *H02K 3/12* (2013.01); *H02K 3/345* (2013.01); *H02K 1/16* (2013.01); *H02K 2203/12* (2013.01)

(58) Field of Classification Search
CPC .................. H02K 3/34; H02K 1/18
USPC ................. 310/208, 214, 215, 194
See application file for complete search history.

(56) References Cited

U.S. PATENT DOCUMENTS

D445,762 S   *   7/2001   Shida ................... D13/122

FOREIGN PATENT DOCUMENTS

| JP | 2001028855 | * | 1/2001 |
| JP | 2001-103698 A | | 4/2001 |
| JP | 2005278223 | * | 10/2005 |
| JP | 2008-125278 A | | 5/2008 |
| JP | 2010-259318 A | | 11/2010 |
| JP | 2010259318 | * | 11/2010 |

OTHER PUBLICATIONS

Japanese Office Action dated Nov. 12, 2013, in corresponding to Japanese Application No. 2012-261039.

* cited by examiner

*Primary Examiner* — Jose Gonzalez Quinone
(74) *Attorney, Agent, or Firm* — Westerman, Hattori, Daniels & Adrian, LLP

(57) ABSTRACT

The stator of the electric motor comprises: a stator core; tooth sections being radially extended from the stator core; an even number of slots, each of which is formed between the tooth sections; an insulator covering the tooth sections; and motor coils being wound in the slots. The insulator has guide projections, each of which corresponds to each of the tooth sections so as to guide a magnet wire. The guide projections have guide sections, each of which includes a base end part and a front end part. In each of the guide sections, a radial thickness of at least one part located in the base end part is thin, a radial thickness of the front end part is thicker than that of the base end part. The guide sections are formed in same side faces of the guide projections arranged in the circumferential direction.

6 Claims, 6 Drawing Sheets

STATOR AND ELECTRIC MOTOR HAVING THE SAME

CROSS-REFERENCE TO RELATED APPLICATION

This application is based upon and claims the benefit of priority of the prior Japanese Patent Application No. P2012-261039, filed on Nov. 29, 2012, and the entire contents of which are incorporated herein by reference.

FIELD

The present invention relates to a stator of an electric motor and an electric motor having the stator.

BACKGROUND

An electric motor has a rotor and a stator. The stator includes a stator core, in which motor coils are respectively wound on tooth sections and an insulator. To increase performance of the motor, a magnet wire is wound in open slots, which are formed between tooth sections of the stator core, as much as possible, so as to increase space factor of the coils.

Conventionally, a nozzle of a coil winding machine is inserted into an open slot, which is formed between tooth sections of a stator core, in a laminating direction of the stator core, so as to wind a magnet wire to form a coil.

For example, a case of a winding magnet wire on a stator core of three-phase/12-slots DC brushless motor will be explained. Tooth sections are named, in the counterclockwise direction, a first tooth section, a second tooth section . . . . In case of winding a U-phase coil, the magnet wire is wound on the first tooth section, then the magnet wire is extended to an outer circumference of an insulator, crossover-wired and wound on the fourth tooth section, further the magnet wire is extended to the outer circumference of the insulator, crossover-wired and wound on the seventh tooth section and the tenth tooth section in the same manner.

Next, the magnet wire is extended to the outer circumference of the insulator and crossover-wired, then a V-phase coil is wound on the adjacent eleventh tooth section. Further, the magnet wire is extended to the outer circumference of the insulator, crossover-wired and wound on the second tooth section. Then, the magnet wire is extended to the outer circumference of the insulator, crossover-wired and wound on the fifth tooth section and the eighth tooth section in the same manner.

Next, the magnet wire is extended to the outer circumference of the insulator and crossover-wired, and a W-phase coil is wound on the adjacent ninth tooth section. Then, the magnet wire is extended to the outer circumference of the insulator, crossover-wired and wound on the twelfth tooth section, the third tooth section and the sixth tooth section, in order, in the same manner.

As shown in FIG. 7, an insulator 52, which is attached to a stator core 51, has guide projections 53, which are projected from the stator core and act as guides for extending a magnet wire 54. A coil is wound on each of tooth sections, and the magnet wire 54 extended to outer circumference of the guide projection 53 is crossover-wired to a next tooth section. For example, an intersecting section 55, in which a crossover wire of a U-phase 54a and a crossover wire of a V-phase 54b intersect with each other, is formed. To reduce an axial length of an electric motor, heights of the crossover wires of the tooth sections are lowered, so that the crossover wires are forced to intersect with each other.

Therefore, for example, if the electric motor having the intersecting section 55, in which the crossover wires 54a and 54b intersect with each other, is continuously used in a state where vibration is applied to the electric motor, problems, e.g., peeling of an insulation film of the magnet wire 54, will occur.

To remove a burden of covering adjacent crossover wires with protection tubes, a stator of an electric motor, in which axial notches with different depths are formed in an insulator (bobbin) and crossover wires are separated by guide projections, have been invented (see Japanese Laid-open Patent Publication No. 2001-103698).

In the insulator (bobbin) disclosed in Japanese Laid-open Patent Publication No. 2001-103698, when the magnet wire wound on one tooth section is extended and crossover-wired to another tooth section, extending positions, from which the magnet wire is outwardly extended, are defined by the notches. Further, when the magnet wire is crossover-wired along outer circumference of the insulator, the crossover wires are separated by the guide projections, so that no crossover wires contact each other. Therefore, electrical contact of the crossover wires can be prevented, and an insulating process can be omitted.

However, an axial length of the insulator must be increased by a thickness of the guide projections, and wiring areas of the crossover wires must be extended in the axial direction. Therefore, it is difficult to downsize the motor in the axial direction.

Further, a position of a terminal, to which a starting end of the coil is connected, and a position of another terminal, to which a terminating end of the coil is connected, are predetermined. Therefore, when the magnet wire is wound by a coil winding machine, the positions of the terminals must be confirmed before setting the stator in the coil winding machine, so set errors will easily occur.

SUMMARY

Accordingly, it is an object to provide a stator of an electric motor capable of solving the above described problems of the conventional stator. Namely, the stator of the present invention is capable of parallel-wiring crossover wires, which are extended to outer circumference of an insulator, without intersecting and easily winding coils.

Another object is to provide an electric motor having said stator.

To achieve the objects, the present invention has following structures.

Namely, the stator of the present invention comprises:
a ring-shaped stator core:
a plurality of tooth sections being radially extended from the stator core;
an even number of slots, each of which is formed between the tooth sections:
an insulator covering the tooth sections; and
a plurality of motor coils being wound on the tooth sections with the insulator and formed in the slots,
the insulator is formed into a ring shape and has guide projections, each of which corresponds to each of the tooth sections so as to guide a magnet wire,
the guide projections respectively have guide sections, each of which includes a base end part and a front end part,
in each of the guide sections, a radial thickness of at least one part located in the base end part is thin, a radial thickness of the front end part is thicker than that of the base end part, and the guide sections are respectively formed in same side faces of the guide projections arranged in the circumferential direction.

With above described structure, when the phase coils are wound on the tooth sections of the stator core, the crossover wire of a first phase can be extended, from the base end part of the guide projection, in which the radial thickness is made thin or a circumferential width is made narrow, along the guide section and can be crossover-wired. Further, the crossover wires of second and following phases can be extended, in parallel with the crossover wire of the first phase, from the same side faces of the guide sections and can be crossover-wired without intersecting. Therefore, wiring areas of the crossover wires can be small in the axial direction, and the stator core of the electric motor can be downsized.

In the stator, the guide sections, in each of which a circumferential width of the base end part is made narrow and a circumferential width of the front end part is wider than that of the base end part, may be respectively formed in the same side faces of the guide projections arranged in the circumferential direction. With this structure, the magnet wire can be wound, by a coil winding machine, from any one of the tooth sections without problems. Therefore, a coil winding work can be easily performed.

Preferably, a groove is formed in the base end part of each of the guide sections.

With this structure, the crossover wire of the first phase can be extended to the outer circumference of the guide projection, via the groove of the base end part, and can be crossover-wired. The crossover wires of the second and following phases can be extended in parallel with the crossover wire of the first phase, from the same side faces of the guide sections and can be crossover-wired without intersecting.

Preferably, a retainer projection is formed on an outer circumferential face of the front end part of each of the guide projections. With this structure, detaching the crossover wires, which are wired in parallel on the outer circumferences of the guide projections, in the axial direction, can be prevented.

In the stator, a slope face may be formed in each of the base end parts so as to reduce the width thereof toward the base end. With this structure, after the crossover wire of the first phase is outwardly extended along the base end part, the crossover wires of the second and following phases can be guided by the slope faces and wired without extending in a height direction of the guide projections.

In the stator of a three or more-phase motor, a crossover wire of a first phase, which is regular-wound on any one of the tooth section of the stator core, may be guided by the guide section, outwardly extended via the base end part of the guide projection, wound on another tooth section, and said steps may be repeated, a crossover wire of a second phase, which is arranged along with the crossover wire of the first phase, may be guided by the guide section, outwardly extended from another tooth section via the base end part of the guide projection, wound on a further tooth section, and said steps may be repeated, and crossover wires of all phases may be crossover-wired, in parallel, on outer circumferential faces of the guide projections, from the base end part to the front end part, without intersecting.

With this structure, even if the coil of the first phase of the three phases is wound on any one of the tooth sections, the crossover wire can be wired, in parallel to the crossover wires of the second and following phases, without intersecting.

The electric motor of the present invention, which comprises a rotor being provided to face the stator of the present invention, can be downsized in the axial direction. Further, the electric motor can be easily produced.

In the stator and the electric motor of the present invention, the crossover wires, which are extended to the outer circumference of the insulator, can be parallel-wired without intersecting, and the coils can be easily wound.

BRIEF DESCRIPTION OF THE DRAWINGS

Embodiments of the present invention will now be described by way of examples and with reference to the accompanying drawings.

DESCRIPTION OF THE PREFERRED EMBODIMENTS

Figure 1:
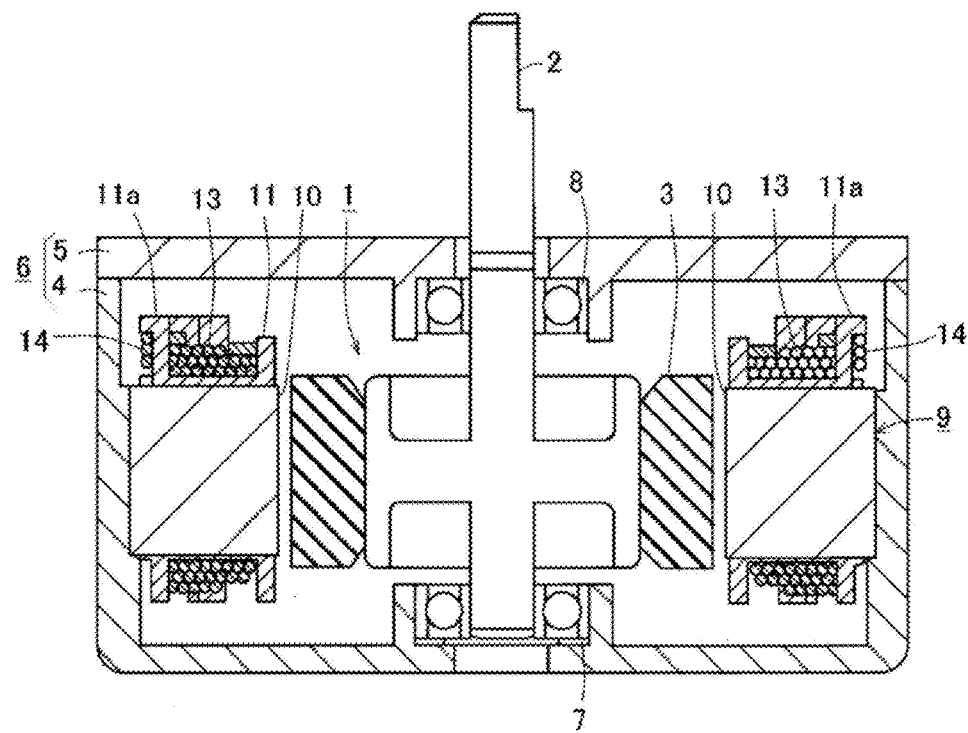
FIG. 1 is a sectional view of an electric motor of an embodiment of the present invention.

Preferred embodiments of the present invention will now be described in detail with reference to the accompanying drawings. In the following description, a three-phase/12-slot inner rotor-type DC brushless motor will be explained as an embodiment of the electric motor of the present invention.

Firstly, a schematic structure of the electric motor will be explained with reference to FIG. 1.

A rotor 1 comprises a shaft 2 and a ring-shaped magnet 3, which is fixed on an outer circumferential face of the shaft 2. The rotor 1 is accommodated in a motor case 6, which is constituted by a main body part 4 and a lid 5. The shaft 2 is rotatably supported by a bearing 7, which is provided to the main body part 4, and a bearing 8, which is provided to the lid 5.

In FIG. 1, a ring-shaped stator core 9 has a plurality of tooth sections (magnetic pole teeth) 10, which are inwardly projected toward the radial center of the stator core 9. The stator core 9 is produced by laminating a plurality of magnetic steel sheets, which have been punched to form into a ring shape, and caulking them. The stator core 9 is covered with an insulator 11. In each of slots 12 (see FIG. 4), a motor coil 13 of three phases are formed from a radially inner part. The motor coil 13 is formed, by a coil winding machine, by winding a magnet wire 14 on the tooth section 10.

Figure 2:
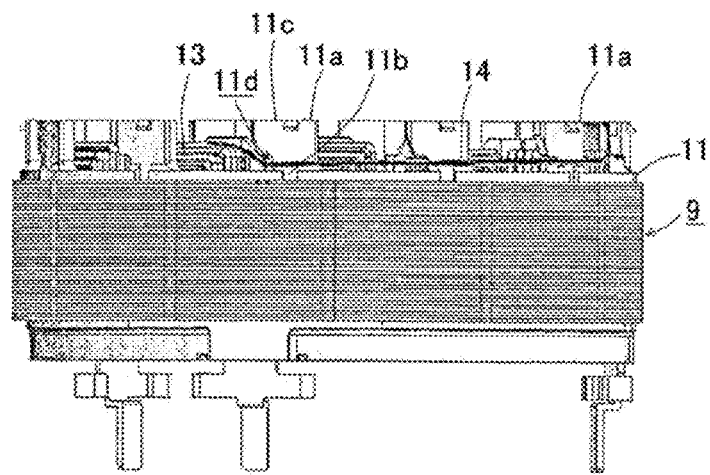
FIG. 2 is a front view of a stator of the electric motor.

In FIG. 2, a plurality of guide projections 11a (e.g., 12 projections) are upwardly projected from the ring-shaped insulator 11. The guide projections 11a guide the magnet wire 14, and each of them corresponds to each of the tooth sections 10.

Figure 3A:
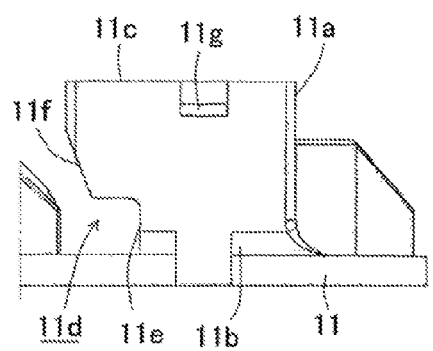
FIGS. 3A and 3B are enlarged views of a guide projection.

As shown in FIG. 3A, each of the guide projections h1a has a guide section 11d, in which a circumferential width of a base end part h1b is narrow and a circumferential width of a front end part 11c is wider than that of the base end part 11b. The guide sections 11d are formed in same side faces of the guide projections 11a arranged in the circumferential direction. In each of the guide sections 11d, a groove 11e is formed in the base end part 11b of the guide projection 11a, and a slope face 11f, which is connected to the groove 11e, is formed. With this structure, a radial width of the guide projection 11a is gradually increased toward the front end part 11c.

In each of the guide projections 11a, a retainer projection 11g, which holds a crossover wire (the magnet wire 14), is projected from an outer face of the front end part 11c.

Figure 3B:
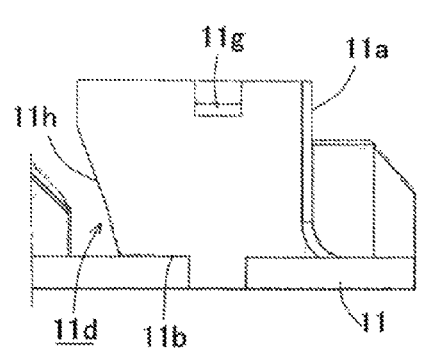

As shown in FIG. 3B, a slope guide section 11h, whose circumferential width is gradually increased from the base end part 11b toward the front end part 11c, may be formed, as the guide section 11d, instead of the groove 11e of the base end part 11b.

Figure 4:
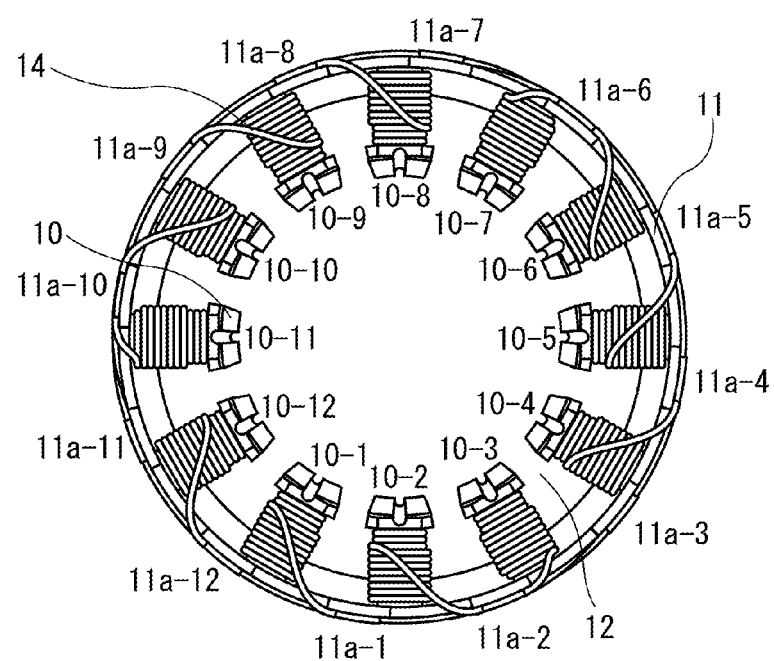
FIG. 4 is a plan photographic view of the stator of the electric motor seen from an axial direction.

An example of wiring the motor coils 13, e.g., three-phase coils, will be explained with reference to FIG. 4. The tooth sections 10 of the stator core 9 are named a first tooth section 10-1, a second tooth section 10-2, a third tooth section 10-3 . . . a twelfth tooth section 10-12 in the counterclockwise direction.

For example, the magnet wire 14 is firstly wound on the first tooth section 10-1 as a U-phase coil, then the magnet wire 14 is outwardly extended to outer circumference of the insulator 11 via a guide projection 11a-1, crossover-wired and wound on the fourth tooth section 10-4. After winding the magnet wire 14 on the fourth tooth section 10-4, the magnet wire 14 is extended to the outer circumference of the insulator 11 via a guide projection 11a-4, crossover-wired and wound on the fourth tooth section 10-4 and the tenth tooth section 10-10 in the same manner. By performing the above described steps, forming the U-phase coils is completed.

Next, the magnet wire 14 is outwardly extended to the outer circumference of the insulator 11 via a guide projection 11a-10 and crossover-wired, then the magnet wire 14 is wound on the adjacent eleventh tooth section 10-11 as a V-phase coil. After winding the magnet wire 14 on the eleventh tooth section 10-11, the magnet wire 14 is extended to the outer circumference of the insulator 11 via a guide projection 11a-11, crossover-wired and wound on the second tooth section 10-2. Then, the magnet wire 14 is extended to the outer circumference of the insulator 11 via a guide projection 11a-2, crossover-wired and wound on the fifth tooth section 10-5 and the eighth tooth section 10-8 in the same manner. By performing the above described steps, forming the V-phase coils is completed.

Next, the magnet wire 14 is outwardly extended to the outer circumference of the insulator 11 via a guide projection 11a-8 and crossover-wired, then the magnet wire 14 is wound on the adjacent ninth tooth section 10-9 as a W-phase coil. After winding the magnet wire 14 on the ninth tooth section 10-9, the magnet wire 14 is extended to the outer circumference of the insulator 11 via a guide projection 11a-9, crossover-wired and wound on the twelfth tooth section 10-12, the third tooth section 10-3 and the sixth tooth section 10-6 in the same manner. By performing the above described steps, forming the W-phase coils is completed.

Figure 5:
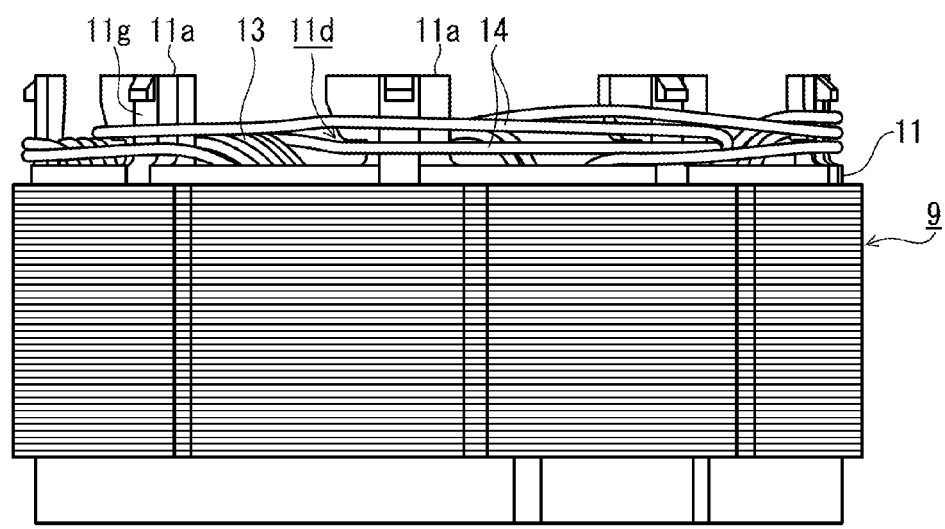
FIG. 5 is a front photographic view of the stator of the electric motor, in which stator coils are wound.

As described above, the crossover wire of a first phase, which has been regular-wound on any one of the tooth sections 10 of the stator core 9, is guided, by the guide section 11d, and outwardly extended from the base end part 11b of the guide projection 11a, then the magnet wire is wound on other tooth sections 10 by repeating these steps. Further, the crossover wire of a second phase, which is arranged in parallel to the crossover wire of the first phase extended from another tooth section 10, is guided, by the guide section 11d, and outwardly extended from the base end part 11b of the guide projection 11a with the crossover wire of the first phase, then the magnet wire is wound on other tooth sections 10 by repeating these steps. Therefore, the crossover wires of all phases can be crossover-wired in a state where the wires are arranged, in parallel or along with each other, on outer circumference of the guide projections 11a. In FIG. 5, the crossover wires (the magnet wire 14) of the three phases are wired in parallel (or arranged along with each other) on the outer circumference of the guide projections 11a without intersecting.

As described above, when the phase coils are wound on the tooth sections 10 of the stator core 9, the crossover wire of the first phase can be crossover-wired by extending the wire from the base end part 11b, which is the narrowest part of the guide projection 11a, along the guide section 11d, and the crossover wires of the second and following phases can be wired by outwardly extending, in parallel to the crossover wire of the first phase, from the same side faces of the guide sections 11d, without intersecting. Therefore, wiring areas of the stator core of the electric motor can be small in the axial direction, and the stator core can be downsized.

Since the guide sections 11d, in each of which the base end part is the narrowest part and the front end part is the wide part, are formed in the same side faces of the guide projections 11a, winding the magnet wire 14 can be started from any one of the tooth sections 10 without causing problems and the winding the magnet wire can be easily performed.

The crossover wire of the first phase can be extended to the outer circumference of the guide projection 11a along the groove 11e and can be crossover-wired. Further, the crossover wires of the second and following phases can be extended, from the same side faces of the guide sections 11d along the slope faces 11f, with the crossover wire of the first phase, without intersecting, and the extended wires can be crossover-wired in parallel. Each of the slope faces 11f is connected to the groove 11e and inclined, so that the width of the base end part 11b is gradually reduced toward the base end, so that the crossover wires of the second and following phases can be wired without extending in the axial direction.

In each of the guide projections 11a, a projection 11g is formed on the outer circumferential face of the front end part 11d, so that detaching the crossover wires, which have been wired in parallel on the outer circumferential face, in the axial direction can be prevented.

Next, another embodiment of the stator will be explained with reference to FIGS. 6A, 6B and 6C. Note that, the structural elements described in the above described embodiment are assigned the same symbols and explanation will be omitted.

Figure 6:
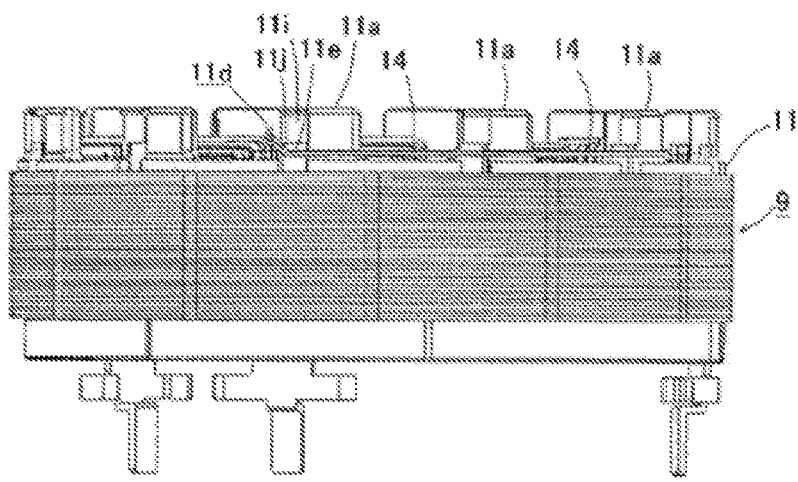
FIG. 6A is a front view of another stator core relating to the present invention.
FIG. 6B is an enlarged view of a guide projection of another stator.
FIG. 6C is a sectional view taken along a line A-B shown in FIG. 6B.
Figure 7:
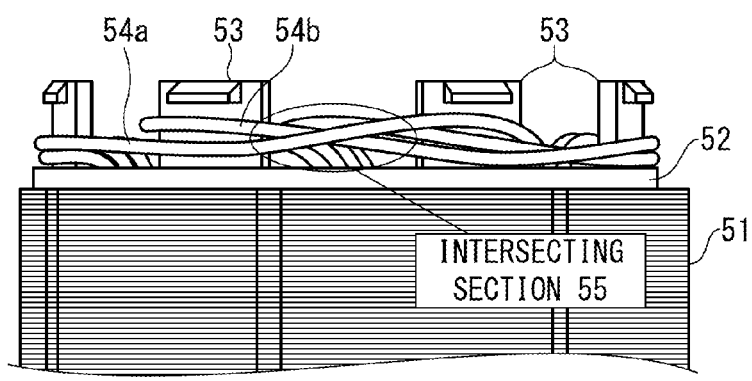
FIG. 7 is a front photographic view of the conventional stator, in which the crossover wires are shown.

As shown in FIG. 6B, in each of the guide projections 11a projected from the insulator 11, a radial thickness of at least one part of the base end part 11b is made thin as a thin part 11j. On the other hand, a thick part 11i, whose radial thickness is thicker than that of the base end part 11b, is formed in the front end part 11c. The guide sections 11d, each of which includes the thin part 11j and the thick part 11i, are respectively formed in the same side faces of the guide projections 11a arranged in the circumferential direction. Note that, the thin part 11j and the thick part 11i need not be formed across the full circumferential width of the guide projection 11a. Further, a plurality of the thin parts 11j may be formed, for example, on the circumferential both sides of the guide projection 11a.

As shown in FIG. 6C, in each of the guide projections 11a, the groove 11e of the guide section 11d is formed by a difference between the radial thicknesses of the thin part 11j and the thick part 11i. The crossover wire of the first phase is outwardly extended along the groove 11e. Note that, in each of the guide projections 11a, a wire retaining section 11g is radially projected from an upper end of the thick part 11i.

As shown in FIG. 6A, the crossover wire (the magnet wire 14) of the first phase can be extended from the base end part 11b of the guide projection 10a, in which the guide section 11d (the thin part 11j) is formed, along the groove 11e. The crossover wires of the second and following phases can be crossover-wired, without intersecting, by outwardly extending, in parallel to the crossover wire of the first phase, from the same side faces of the guide sections 11d (the thin part 11j or the thick part 11i). Further, the base end part 11b of each of the guide projections 11a has an enough circumferential width.

Therefore, even if the crossover wires are wired along each of the guide projections 11a, each of the guide projections 11a can secure enough strength.

In the above described embodiments, the stators of the inner rotor-type motors have been explained, but the stator of the present invention is not limited to the embodiments. The stator of the present invention may be applied to outer rotor-type motors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A stator of an electric motor, comprising:
a ring-shaped stator core;
a plurality of tooth sections being radially extended from the stator core;
an even number of slots, each of which is formed between the tooth sections;
an insulator covering the tooth sections; and
a plurality of motor coils being wound on the tooth sections with the insulator and formed in the slots,
wherein the insulator is formed into a ring shape and has guide projections, each of which corresponds to each of the tooth sections so as to guide a magnet wire,
the guide projections respectively have guide sections, each of which includes a base end part and a front end part,
in each of the guide projections, each of the guide sections comprises: a thin part, which is at least one part of the base end part and whose radial thickness is made thin; a thick part, which is a part of the front end part and whose radial thickness is thicker than that of the base end part; and a groove, which is formed, in the base end part, by a thickness difference between the thin part and the thick part,
the guide sections are respectively formed in same side faces of the guide projections arranged in the circumferential direction, and
a retainer projection is formed on an outer circumferential face of the thick part of the front end part of each of the guide projections.

2. The stator according to claim 1,
wherein the electric motor is a three or more-phase motor,
a crossover wire of a first phase, which is regular-wound on any one of the tooth section of the stator core, is guided by the guide section, outwardly extended via the base end part of the guide projection, wound on another tooth section, and said steps are repeated,
a crossover wire of a second phase, which is arranged along with the crossover wire of the first phase, is guided by the guide section, outwardly extended from another tooth section via the base end part of the guide projection, wound on a further tooth section, and said steps are repeated,
crossover wires of all phases are crossover-wired, in parallel, on outer circumferential faces of the guide projections, from the base end part to the front end part, without intersecting.

3. An electric motor, comprising:
a rotor being provided to face the stator of claim 1.

4. The stator according to claim 1, wherein the guide sections are formed in the side faces, which are located on an upstream side in a direction of crossover-wiring cross over wires, which are crossover-wired, on an outer periphery side of each guide projection, in the same circumferential direction.

5. A stator of an electric motor, comprising:
a ring-shaped stator core;
a plurality of tooth sections being radially extended from the stator core;
an even number of slots, each of which is formed between the tooth sections;
an insulator covering the tooth sections; and
a plurality of motor coils being wound on the tooth sections with the insulator and formed in the slots, wherein
the insulator is formed into a ring shape and has guide projections, each of which corresponds to each of the tooth sections so as to guide a magnet wire,
the guide projections respectively have guide sections, each of which includes a base end part and a front end part,
in each of the guide projections, each of the guide sections comprises a narrow groove, which is circularly formed in the base end part; and a slope face, which is formed in the front end part, continued from the groove and inclined and whose width in the circumferential direction is wider than that of the base end part,
the guide sections are respectively formed in same side faces of the guide projections arranged in the circumferential direction, and
a retainer projection is formed on an outer circumferential face of the front end part of each of the guide projections.

6. A stator of an electric motor, comprising:
a ring-shaped stator core;
a plurality of tooth sections being radially extended from the stator core;
an even number of slots, each of which is formed between the tooth sections;
an insulator covering the tooth sections; and
a plurality of motor coils being wound on the tooth sections with the insulator and formed in the slots, wherein
the insulator is formed into a ring shape and has guide projections, each of which corresponds to each of the tooth sections so as to guide a magnet wire,
the guide projections respectively have taper-guide sections, each of which includes a base end part and a front end part,
in each of the guide projections, each of the taper-guide sections is made wide from the base end part to the front end part,
the taper-guide sections are respectively formed in same side faces of the guide projections arranged in the circumferential direction, and a retainer projection is formed on an outer circumferential face of the front end part of each of the guide projections.

* * * * *